3,095,299
HERBICIDAL COMPOSITION AND METHOD
Raymond W. Luckenbaugh, Wilmington, Del., assignor to E. I. du Pont de Nemours and Company, Wilmington, Del., a corporation of Delaware
No Drawing. Filed May 11, 1960, Ser. No. 28,191
2 Claims. (Cl. 71—2.6)

This invention relates to the discovery that a combination of at least one herbicidal aryl alkyl urea with certain esters of thiolcarbamic acid derivatives surprisingly has herbicidal power not possessed by either component employed separately.

I have found that mixtures of herbicidal aryl alkyl ureas with certain esters of thiolcarbamic acid derivatives give surprising herbicidal results. These combinations are more effective as weed killers than either herbicidal component used alone at equivalent rates. These combinations are superior in that they control a wider variety of broadleaf and grass weeds.

This enhanced effectiveness is particularly outstanding in the case of pre-emergence control of weeds in crop areas because the crops are tolerant to these combinations when they are applied at low dosage rates that are sufficient to give weed control.

The herbicidal aryl alkyl ureas employed in compositions and processes of the invention can be fenuron (1,1-dimethyl-3-phenylurea), monuron (1,1-dimethyl-3-p-chlorophenylurea), diuron (1,1-dimethyl-3-(3,4-dichlorophenyl)urea), neburon (3-(3,4-dichlorophenyl)-1-n-butyl-1-methylurea), or any of these in which one methyl group is replaced by a methoxy group, namely 1-methoxy-1-methyl-3-phenylurea, 1-methoxy-1-methyl-3-p-chlorophenylurea, or 1-methoxy-1-methyl-3-(3,4-dichlorophenyl)urea.

The thiolcarbamic acid derivatives used are of the formula

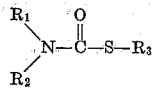

where $R_1$, $R_2$, and $R_3$ are alkyl radicals containing 2, 3, or 4 carbon atoms.

Illustrative of thiolcarbamic acid derivatives which can be used are:

N,N-di(n-propyl)thiolcarbamic acid, ethyl ester
N-(n-butyl)-N-ethylthiolcarbamic acid, n-propyl ester
N,N-di(n-propyl)thiolcarbamic acid, n-propyl ester
N-(n-butyl)-N-ethylthiolcarbamic acid, ethyl ester
N,N-diethyl thiolcarbamic acid, n-butyl ester In operating in accordance with the present invention, any suitable amount of herbicidal aryl alkyl urea can be employed in combination with the thiolcarbamate to obtain compositions in which the two herbicidal components are mutually activating. The relative proportions of the active components will vary depending upon the particular aryl alkyl urea employed, the plant species to be controlled, the physiological age of the plants, the prevailing climatic conditions, etc. It is impossible, therefore, to state exactly the proportions that will be used in all situations; and, indeed, the exact amounts of toxicants in the mixture do not appear to be critical. In general, however, the compositions of the invention will contain from about 0.20 to 16 parts by weight of thiolcarbamate for each part by weight of aryl alkyl urea. In terms of proportions, the relative amounts of each respective herbicidal component can be said to be from about 16:1 to 1:5, the ratios indicating the amount of thiolcarbamate to substituted urea.

It is much preferred to formulate the active components of the invention, comprising herbicidal aryl alkyl urea compounds and thiolcarbamates with conventional pest control adjuvants, modifiers, or diluents, hereinafter called inert carriers, because handling is facilitated and herbicidal action is thereby frequently enhanced. Such herbicidal compositions or formulations are prepared in the form of powdered solids, granules, or liquids.

These compositions, whether solutions, emulsions, dispersions of the active components in a liquid solvent, or wettable powders, often have as an inert carrier one or more of the surface-active agents in amounts sufficient to render a given composition containing the active component readily dispersible in water or in oil. By the term "surface-active agent" it is understood that wetting agents, dispersing agents, suspending agents, and emulsifying agents are included.

Suitable surface-active agents are set out, for example, in Searle U.S. Patent No. 2,426,417, Todd U.S. Patent No. 2,655,447, Jones U.S. Patent No. 2,412,510, or Lenher U.S. Patent No. 2,139,276. A detailed list of such agents is set forth in an article in "Soap and Chemical Specialties," vol. 31, No. 7, pages 50–61; No. 8, pages 48–61; No. 9, pages 52–67; and No. 10, pages 38–67 (1955); see also McCutcheon, "Chemical Industries," November 1947, page 8011, entitled "Synthetic Detergents," and Bulletin E–607 of the Bureau of Entomology and Plant Quarantine of the U.S. Department of Agriculture. In general, less than 10% by weight of surface-active agent is present in the compositions of the invention and the amount of surface-active agent in any given composition can be as low as 1% or even less.

Powdered or dust compositions of the invention, whether or not also modified with a surface-active agent, are prepared by mixing the active compounds of the invention with finely divided inert carriers. Such carriers are preferably talc, natural clays, pyrophyllite, diatomaceous earth and flours such as walnut shell, wheat, soya, redwood and cotton seed flours. Other inert solids which can be used include magnesium, calcium carbonates, calcium phosphates, sulfur, lime, etc., either in powder or in granular form. The percentages by weight of the active components of the invention and the powdered or dust compositions of the invention will vary according to the manner in which the composition is to be applied, but in general will be from about 0.1 to 95 percent by weight of the herbicidal composition.

Herbicidal compositions containing the components of the invention can also be prepared by dispersing the compositions in an inert nonaqueous carrier. Aliphatic and aromatic hydrocarbons, for example, hydrocarbons of petroleum origin, are preferred as carriers. These dispersions are prepared by milling the compositions of the invention with dispering agents and suspending agents and the inert liquid carriers in mills such as pebble mills. The amount of the herbicides in the dispersion can range from 10% or less to 40 or even 50 percent by weight of the oil dispersion.

Adhesives such as gelatin, blood albumen, resins, for example, rosin, alkyd resins and the like, can also be used in certain compositions to increase retention or tenacity of deposits following application.

Compositions of the invention may be prepared in various ways as follows:

Wettable powders are prepared by combining in a blender the two active components in the desired ratio together with a fluffing diluent as a grinding aid, a wetting agent to assure easy preparation of an aqueous suspension and also a dispersing agent to prevent flocculation in water. These components are blended together, then passed through a hammer mill or other suitable grinding device until the particle size is substantially all below 50 microns. The product is then reblended until homogeneous.

Aqueous dispersions are prepared by mixing the active components, a dispersing agent, and a suspending agent with water and grinding in a pebble mill or sand mill until the insoluble particles are substantially all below 5 microns.

Oil dispersions are prepared in substantially the same way as aqueous dispersions, but in this case the dispersing agent chosen is also an emulsifier for the oil so that the final product can be diluted with water to form a spray emulsion.

Granules are prepared by spraying an aqueous suspension-emulsion of the two active components upon a granular diluent such as granular attapulgite while tumbling the latter to obtain uniform deposition. Alternatively, granules may also be prepared by blending a powdered form of the solid active material with attapulgite or calcium magnesium bentonite, moistening the mix, granulating, and drying, followed by impregnation with the liquid active material by spraying on the dry granules.

Dusts are most frequently prepared by diluting wettable powders with a dense, rapid settling diluent such as micaceous talc by blending the two together in a ribbon or cone blender. Alternatively, where wetting and dispersing agents are undesirable, the active components are first mixed with a minor amount of a fluffing diluent as a grinding aid, micropulverized and then blended with the dense major diluent.

The herbicidal compositions are applied as sprays, dusts or granules to the locus or area to be protected from weeds. Such application can be made directly upon the locus or area to be protected and the weeds thereon during the period of weed infestation in order to destroy the weeds, or, alternatively, the application can be made in advance of an anticipated weed infestation to prevent such infestation. Thus, the compositions can be applied as aqueous foliar sprays or as sprays directly to the surface of the soil. Alternatively, the dry powdered or granulated compositions can be applied directly on the plants or on the soil. For some purposes it will be convenient to use granular forms of the compositions such as in the treatment of pond and lake bottoms or in the treatment of vegetation where it is desirable to get the composition on the soil surface without depositing it on the plant foliage.

The active ingredients are, of course, applied in amounts sufficient to exert the desired herbicidal action. The amount of herbicidally active compounds present in the compositions as actually applied for destroying or preventing weeds will vary with the herbicidal activity of the active ingredients, the purpose for which the application is being made (i.e., whether for short-term or long-term control), the manner of application, the particular weeds for which control is sought, and like variables. Thus, if highly active ingredients are to be used for the control of weed infestations that plague food crops, the compositions containing the active ingredients are normally further diluted with a liquid to form a spray composition or with a powdered solid to give a dust containing relatively low concentrations of active compounds.

The herbicidal compositions as applied in the form of a spray or a dust will contain from about 0.02 percent to 95 percent by weight of the combined herbicidally active components. For pre-emergence use the rate of application of active components of the invention will range from about 0.25 to 5 pounds per acre for herbicidal aryl alkyl urea compounds in the compositions of the invention. For general long-term weed control, such as on industrial sites, one might choose to use rates as high as 50 pounds per acre of the combined active materials. Of course, the thiolcarbamates will be in these formulations according to the ratios expressed earlier. Certain particular usage rates, such as 0.25 to 2 pounds per acre, are preferred for some crop uses. It must be understood that the determination of the proper rate in any given instance is conventional procedure to those skilled in the art of pre-emergence weed control.

Pre-emergence applications of these compositions give effective weed control for large variety of weed species with a good safety factor for crops. For example, seedling broadleaf weeds, germinating nuts edge and grasses are more effectively controlled by this mixture than they are by either component used alone in total equivalent amounts.

The mixtures are used for weed control in corn, alfalfa, cotton, potatoes, sugarcane, flax and strawberries. For example, 2 pounds per acre of neburon in combination with 2 pounds per acre of N,N-dipropylthiocarbamic acid, ethyl ester gives effective weed control with no injury to alfalfa.

Some variation in application rates will be caused by the particular type of soil involved in pre-emergence applications. Thus, more highly adsorptive soils can have applied to them higher rates of active components of the invention without affecting crop tolerance to the combinations. In general, however, the rates of application will be those expressed above for the combinations of the invention.

In order that the invention can be better understood, the following examples are given in addition to the examples already given above. The examples illustrate typical herbicidal compositions of the invention, methods for their preparation, herbicidal applications, and the results obtained. The numbers following the tabulated ingredients represent parts by weight of the ingredients in the respective compositions unless otherwise noted.

*Example 1*

Granular formulations: Percent
N,N - dipropylthiolcarbamic acid, ethyl ester (EPTC) _____ 0.8
3-phenyl-1,1-dimethylurea (fenuron) _____ 0.2
Granular 15–30 mesh attapulgite _____ 99.0

In the preparation of the above composition, finely ground fenuron is suspended in water as a 10% aqueous suspension. N,N-di(n-propyl)thiolcarbamic acid, ethyl ester is dissolved in acetone to yield a 10% solution. Granular attapulgite, 15–30 mesh, is placed in a revolving drum and well agitated. It is sprayed, from separate nozzles, with the solution of N,N-di(n-propyl)thiolcarbamic acid, ethyl ester and the suspension of fenuron so that 8 pounds of the solution and 2 pounds of the suspension are applied per 100 pounds of attapulgite. The resulting granular product is dried, then applied with a fertilizer spreader at a rate of 250 pounds per acre. This is used as a pre-emergence treatment for weed control in cotton on certain soils. This controls weeds such as Johnson grass, crab grass, foxtail, lamb's quarters, chickweed, rough pigweed, mustard, and velvet leaf.

Example 2

Granular formulation: Percent
- N-butyl-N-ethylthiolcarbamic acid, n-propyl ester _____ 1.0
- 3 - (3,4 - dichlorophenyl) - 1 - n-butyl-1-methyl- urea (neburon)_____ 1.0
- Granular 15–30 mesh attapulgite _____ 98.0

A granular formulation containing the above components is prepared in the manner described in Example 1. It is applied with a fertilizer spreader at a rate of 20 pounds per acre to sweet corn. Effective control of grass and broadleaf weeds is obtained without injury to the corn.

Example 3

Dust: Percent
- 3 - (parachlorophenyl) - 1,1-dimethylurea (monuron) _____ 2
- N,N-dipropylthiolcarbamic acid, ethyl ester (EPTC) _____ 4
- Attapulgite _____ 20
- Micaceous talc _____ 74

The monuron, N,N-di(n-propyl)thiolcarbamic acid, ethyl ester and attapulgite are first blended and ground through a micropulverizer, then reblended with micaceous talc. The composition is applied with a dust spreader at 50 pounds per acre. This is used as a treatment for weed control in asparagus. It is applied before the seedlings emerge or before spears emerge in the spring.

Similar results are obtained when one replaces the monuron of Example 3 with an equivalent amount of 3-(p-chlorophenyl)-1-methoxy-1-methylurea.

Example 4

Wettable powder: Percent
- 3-(3,4 - dichlorophenyl) - 1,1 - dimethylurea (diuron) _____ 9.38
- N,N-dipropylthiolcarbamic acid, ethyl ester (EPTC) _____ 25.00
- Diatomaceous silica _____ 63.82
- Alkyl naphthalene sulfonic acid, sodium sol__ 1.50
- Low viscosity methylcellulose _____ 0.30

The above composition is prepared by blending the components together in a ribbon blender, micropulverizing and reblending. This composition is extended in water and sprayed at a rate of ¾ pound per acre of diuron and 2 pounds per acre of N,N-di(n-propyl)thiolcarbamic acid ethyl ester, as a pre-emergence treatment to a field sown with corn. Excellent control of germinating annual broadleaves and grasses is obtained. Some retardation of nut sedge growth is noted. The corn is tolerant to combinations of this type.

N-ethyl-N-n-butylthiolcarbamate, n-propyl ester can also be used in the above example in place of the N,N-dipropylthiolcarbamic acid, ethyl ester. Annual weeds in crops such as peanuts, corn, and green beans are controlled.

Similar results can also be obtained by replacing the diuron of the above example with an equivalent amount of 3-(3,4-dichlorophenyl)-1-methoxy-1-methylurea.

Example 5

Granules: Percent
- 3 - (3,4 - dichlorophenyl) - 1 - methyl - 1 - n - butylurea (neburon)_____ 1
- N,N-dipropyl thiolcarbamic acid, ethyl ester (EPTC) _____ 1
- Granular attapulgite_____ 98

The above composition is prepared as a granular as described above in Example 1. This composition is applied at a rate of 200 pounds per acre as a pre-emergence treatment in alfalfa and strawberries. This controls annual weeds during the growing season, especially such weeds as pigweed, annual bluegrass, chickweed, wild mustard, crab grass and foxtail.

Example 6

Emulsifiable Oil: Percent
- 3 - (3,4 - dichlorophenyl) - 1,1 - dimethylurea (diuron) _____ 15
- N,N-dipropyl thiolcarbamic acid, n-propylester__ 25
- Alcolated naphthalene (principally alpha methyl naphthalene) _____ 55
- Alkyl aryl polyether alcohol_____ 5

This composition is prepared by simply mixing the components. It is emulsified in water for application. When applied at a rate of 3 pounds per acre of the herbicidal urea and 5 pounds per acre of the thiolcarbamate, excellent weed control is obtained in sugar cane fields. Control of seedling Johnson grass, crab grass, foxtail, pigweed, and lamb's quarters is attained. Severe retardation of nut sedge is noted.

Example 7

Granular: Percent
- 3 - (3,4 - dichlorophenyl) - 1 - n - butyl - 1-methylurea (neburon)_____ 2.5
- N,N-dipropyl thiolcarbamic acid, ethyl ester___ 2.5
- Granular attapugite_____ 95.0

These granular compositions are prepared in the same manner as described in Example 4 and they are applied by hand at a rate of 100 pounds per acre. They control annual grasses and broadleaf weeds around ornamental plants, such as yews, arborvitae, pfitzer juniper and black spruce, without injury.

Example 8

Dust: Percent
- 3 - (parachlorophenyl) - 1,1 - dimethylurea (monuron) _____ 1
- N,n-butyl-N-ethylthiolcarbamic acid, n-propyl ester _____ 5
- Attapulgite _____ 20
- Micaceous talc_____ 74

The monuron, N,N-di(n-propyl)thiolcarbamic acid ethyl ester and attapulgite are first blended and ground through a micropulverizer, then reblended with micaceous talc. The composition when applied at a rate of 100 pounds per acre to a plowed field retards nut sedge growth and germinating broadleaf weeds.

This application is a continuation-in-part of my application Serial No. 805,732, filed April 13, 1959, now abandoned, which in turn is a continuation-in-part of Serial No. 726,328, filed April 4, 1958, and now abandoned.

The invention claimed is:

1. A herbicidal composition comprising a herbicidally effective amount of a compound selected from the group consisting of 1,1-dimethyl-3-phenylurea, 1,1-dimethyl-3-p-chlorophenylurea, 1,1 - dimethyl-3-(3,4-dichlorophenyl) urea, 3-(3,4 - dichlorophenyl)-1-n-butyl-1-methylurea, 1-methoxy-1-methyl-3-phenylurea, 1 - methoxy-1-methyl-3-p-chlorophenylurea, and 1 - methoxy-1-methyl-3-(3,4-dichlorophenyl) urea in admixture with a herbicidally effective amount of a compound selected from the group consisting of compounds of the formula

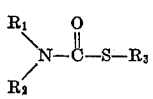

where $R_1$, $R_2$, and $R_3$ are alkyl radicals containing from 2 through 4 carbon atoms.

2. A process for the control and destruction of weeds, which process comprises applying, to a locus to be protected, a composition comprising a herbicidally effective amount of a compound selected from the group consisting of 1,1-dimethyl-3-phenylurea, 1,1-dimethyl-3-p-chlorophenylurea, 1,1-dimethyl-3-(3,4-dichlorophenyl)urea, 3-(3,4-dichlorophenyl)-1-n-butyl-1-methylurea, 1-methoxy-1-methyl-3-phenylurea, 1-methoxy-1-methyl-3-p-chlorophenylurea, and 1-methoxy-1-methyl-3-(3,4-dichlorophenyl)urea in admixture with a herbicidally effective amount of a compound selected from the group consisting of compounds of the formula

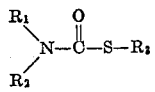

where $R_1$, $R_2$, and $R_3$ are alkyl radicals containing from 2 through 4 carbon atoms.

References Cited in the file of this patent

UNITED STATES PATENTS

| | | |
|---|---|---|
| 2,709,648 | Ryker et al. | May 31, 1955 |
| 2,913,326 | Tilles et al. | Nov. 17, 1959 |
| 2,913,327 | Tilles et al. | Nov. 17, 1959 |
| 2,913,328 | Tilles et al. | Nov. 17, 1959 |
| 2,960,534 | Scherer et al. | Nov. 15, 1960 |